Jan. 24, 1961 F. J. BOURASSA 2,969,487
SEALED CRYSTAL DIODE PACKAGES
Filed Aug. 26, 1957
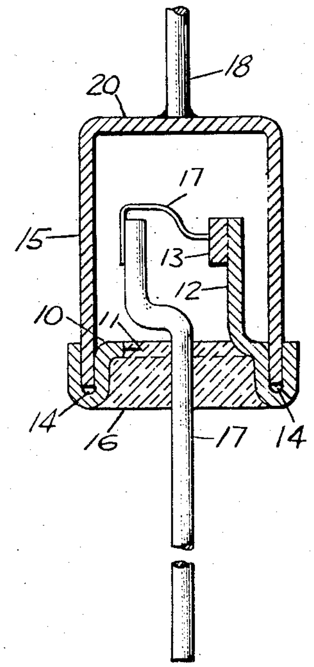
INVENTOR
FRANCIS J. BOURASSA
BY Elmer J. Gorn
ATTORNEY United States Patent Office 2,969,487
Patented Jan. 24, 1961

2,969,487

SEALED CRYSTAL DIODE PACKAGES

Francis J. Bourassa, Needham, Mass., assignor to Raytheon Company, a corporation of Delaware

Filed Aug. 26, 1957, Ser. No. 680,327
1 Claim. (Cl. 317—234)

This invention relates to packages for crystal diodes of the coaxial type.

In making crystal diodes one lead is frequently attached to a face of the diode chip by soldering or welding the end of a conductor to the semiconductor. When this is done, pieces of the solder or conductor frequently become attached to the chip outside of the main area of contact. These pieces interfere with the proper operation of the diode and are usually removed by etching.

In certain applications it is desirable to have the leads come out from opposite ends of the envelope. One way of doing this is to mount the crystal in a glass envelope and have the leads come out through the glass-to-metal seals at each end. With this type of mounting the diode can be etched once and mounted, but once mounted cannot be easily demounted and re-etched if tests indicate this to be necessary. This means that the diode must be scrapped if the first etching is not sufficient.

By the construction of the invention, a semiconductor chip is mounted by means of an ohmic connection to an inwardly extending protrusion on a plate formed with a central opening through which one connector passes and is sealed by means of a metal-to-glass seal. The inwardly extending protrusion is preferably formed together with the opening by a punching operation. The central electrode is connected to the chip by means of a whisker or thin conductor. The plate is also formed with a moat or recess about its periphery to receive the edges of the open end of a metal can forming the envelope. The second lead is soldered to the closed end of the can. Current flows between the leads through the can, the protrusion, the crystal chip, the whisker and the second lead. Even after sealing the unit, it may easily be demounted by softening the solder in the moat and pulling the cup away from the disk, after which the mounted crystal can be re-etched if required. The process can be repeated as many times as necessary. Thus scrap is reduced to a minimum.

Other and further features and advantages of this invention will be apparent from the following description with reference to the accompanying drawing which is a longitudinal section of an embodiment of the invention.

In the drawing, the reference numeral 10 designates a disk of conductive material formed with a central opening 11 which is made by cutting out three sides of a tab 12 and forcing it upward to form the support for a chip 13 of semiconductive metal to which it is mechanically and electrically attached by soldering or welding to form an ohmic contact. The periphery of the disk 10 is formed into a moat 14 adapted to receive the edges of a metallic can 15 which is soldered to the moat 14. The tab 12 and the moat 14 can be formed in a single stamping operation. The opening 11 is filled with glass 16 forming a glass-to-metal seal with a conductive load 17 which is bent outward and up as its inner end. A fine whisker 17 of conductive material is connected to the upper end of the rod 17 and bent to form a pressure contact with the semiconductor chip 13 to which it is welded or otherwise connected. A second connector 18 is attached to the top 20 of the can 15. It can readily be seen that with the can 15 removed, the crip with the conductor 17 and the tab 12 connected can easily be dipped in an etching solution, yet the packaged unit may be readily connected into a circuit as a coaxial unit.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claim.

What is claimed is:

A sealed semiconductor device comprising a disk-like conductive cap member having an annular peripheral groove and a struck-up central portion, a semiconductor body mounted on said cap member with one face thereof in contact with said struck-up portion, a conductive lead member having one end thereof conductively connected to the face of said semiconductor body opposite to said one face, said lead member being insulatedly mounted on and passing through said cap member, a second conductive lead member, and a cylindrical conductive housing having a closed end conductively connected to said second lead member and an open end positioned in said annular peripheral groove, whereby said housing may be removably secured to said cap member by a metal solder contained within said groove in said cap member.

References Cited in the file of this patent

UNITED STATES PATENTS

| | | |
|---|---|---|
| 2,749,488 | Mayer | June 5, 1956 |
| 2,825,014 | Willemse | Feb. 25, 1958 |
| 2,838,722 | Watson | June 10, 1958 |